United States Patent [19]
Roach et al.

[11] Patent Number: 5,267,496
[45] Date of Patent: Dec. 7, 1993

[54] TIRE CUTTING APPARATUS

[76] Inventors: Ray D. Roach, 5584 Myrtle Hill; Cecil H. Roach, 6245 Myrtle Hill, both of Valley City, Ohio 44280; Daniel A. Crane, Rte. 12, Box 69, Asbury, W. Va. 24916

[21] Appl. No.: 847,641

[22] Filed: Mar. 6, 1992

Related U.S. Application Data

[63] Continuation-in-part of Ser. No. 741,729, Aug. 7, 1991, abandoned.

[51] Int. Cl.5 .............................................. B26D 1/09
[52] U.S. Cl. ....................................... 83/133; 83/137; 83/155; 83/176; 83/386; 83/460; 83/461; 83/465; 83/620; 83/639.1; 83/923; 83/951
[58] Field of Search ................... 83/19, 133, 137, 148, 83/155, 176, 386, 390, 460, 461, 465, 620, 636, 639.1, 639.5, 923, 951

[56] References Cited

U.S. PATENT DOCUMENTS

| | | | |
|---|---|---|---|
| 3,911,772 | 10/1975 | Kisielewski | 83/923 X |
| 3,922,942 | 12/1975 | Fawcett et al. | 83/620 |
| 4,030,391 | 6/1977 | Swanson et al. | 83/137 |
| 4,180,004 | 12/1979 | Johnson | 241/236 X |
| 4,276,692 | 7/1981 | Casler et al. | 83/663 X |
| 4,338,840 | 7/1982 | Farrell, Sr. et al. | 83/639.1 X |
| 4,694,716 | 9/1987 | Sakamoto | 83/620 X |
| 4,829,865 | 5/1989 | Nunnery et al. | 83/461 X |
| 4,873,759 | 10/1989 | Burch | 83/923 X |
| 4,967,626 | 11/1990 | Doster et al. | 83/176 X |

*Primary Examiner*—Eugenia Jones
*Assistant Examiner*—Raymond D. Woods
*Attorney, Agent, or Firm*—Fay, Sharpe, Beall, Fagan, Minnich & McKee

[57] ABSTRACT

A hydraulically actuated tire cutter includes a first conveyor belt which loads a tire into a tire cutting position between a fixed plate, a moving plate and a plurality of adjustable bars. Twelve corresponding pairs of gripping jaws project from the fixed and moving plate. The gripping jaws have a saw tooth edge. Each pair of gripping jaws of the fixed and moving plate are in registration with one another to compress the tire until one of the tire's beads essentially touches the other. Twelve blades attached to a blade plate are hydraulically actuated to pass through a passage in the moving plate and the fixed plate to radially cut the tire. After the tire has been cut, a second conveyor belt removes the pieces of tire from the bottom portion of the tire cutter.

40 Claims, 5 Drawing Sheets

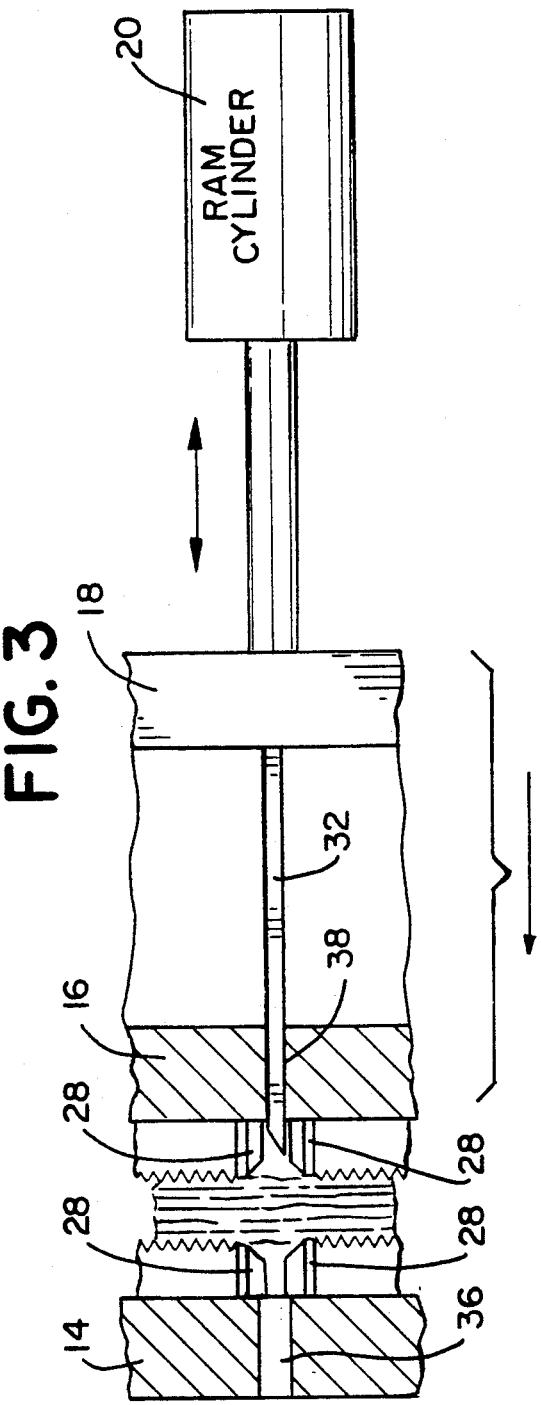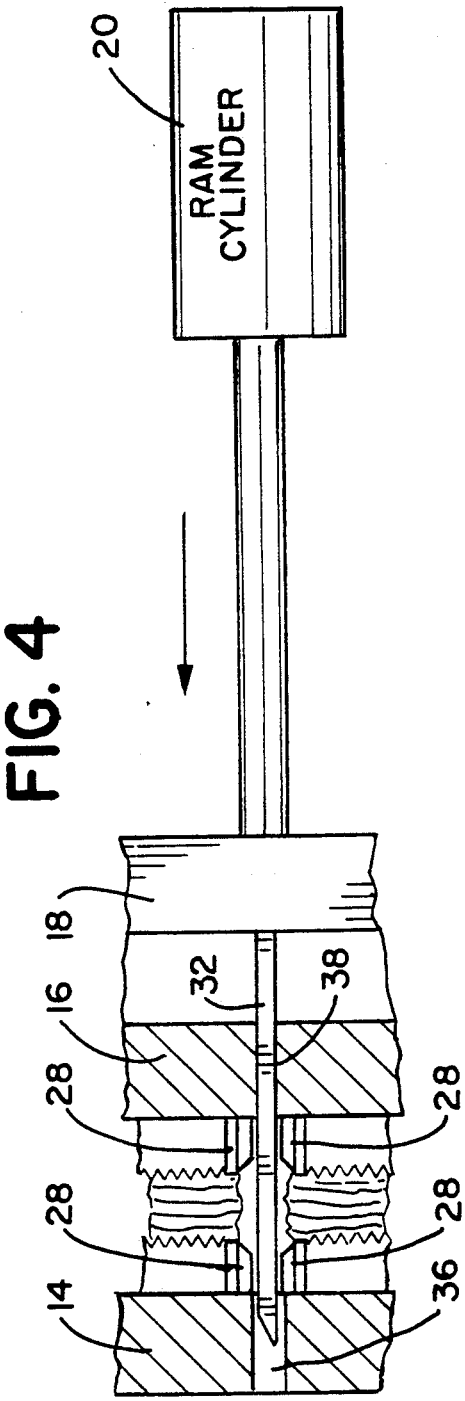

TIRE CUTTING APPARATUS

CROSS-REFERENCE TO RELATED APPLICATIONS

This is a continuation-in-part of application Ser. No. 07/741,729, filed Aug. 7, 1991, now abandoned.

BACKGROUND OF THE INVENTION

1. Field of the Invention

This invention pertains to the art of machines for disposing of used tires, and more particularly to a machine which cuts a used tire into radial sections to facilitate disposal and/or further shredding.

2. Description of the Related Art

Several apparatuses are known in the art for the disposal of used tires. However, many of these tire disposal apparatuses cannot easily handle the bead wires of conventional tires. Instead, the bead wires must be manually cut out of the tire before the tire is shredded. Further, these prior art apparatus are sometimes too costly or unreliable to be effective. In any event, the problem of tire disposal is a significant one with many dumps and junkyards overflowing with used tires faster than they can be processed.

SUMMARY OF THE INVENTION

Tires formed from natural and synthetic rubber often are disposed of in garbage dumps, junk yards, and the like after their useful life. Recently, efforts to reduce the build up in dumps and junk yards has resulted in attempts to recycle old tires. To do this, tires are shredded into considerably smaller pieces and thereafter processed to be reused. However, the size of a shredder must be considerable to shred a tire from the largest trucks and other various commercial and farm vehicles.

Larger tires such as those from trucks and farm vehicles also incorporate larger bead in the tire design. The beads of tires present the greatest difficulty to shredders in that the beads are composed of many strands of high strength wire. Most shredders have such difficulty with the bead wires of tires that the bead area of the tire is often cut from the tire and discarded with the remaining portions of the tire being shredded. Such operation is costly and slow as well as inconvenient. While even passenger tire beads can be troublesome, beads from larger tires are extremely difficult for most shredders to process.

To that end, the present invention relates to a tire cutter, preferably actuated by a hydraulic ram, that reduces the size of even the largest tires to pieces that can be managed by a smaller size shredder. Therefore, considerable energy can be saved by using the combination of a tire cutter as disclosed in the present invention and a smaller size shredder, then by using one shredder of a considerably larger size to handle all types of tires. The present invention incorporates a method of cutting the tire so that the bead wires do not have to be stripped from the tire before shredding. Further, the bead wire is broken in small enough segments that shredders are able to processor the bead wire along with the rest of the tire.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

BRIEF DESCRIPTION OF THE DRAWINGS

FIG. 3 is a front elevation view of a tire cutter with the blade position just prior to cutting a tire;

FIG. 4 is a front elevation view of the tire cutter with the blade shown at its most forward position;

DETAILED DESCRIPTION OF THE PRESENTLY PREFERRED EXEMPLARY EMBODIMENTS

Figure 1:
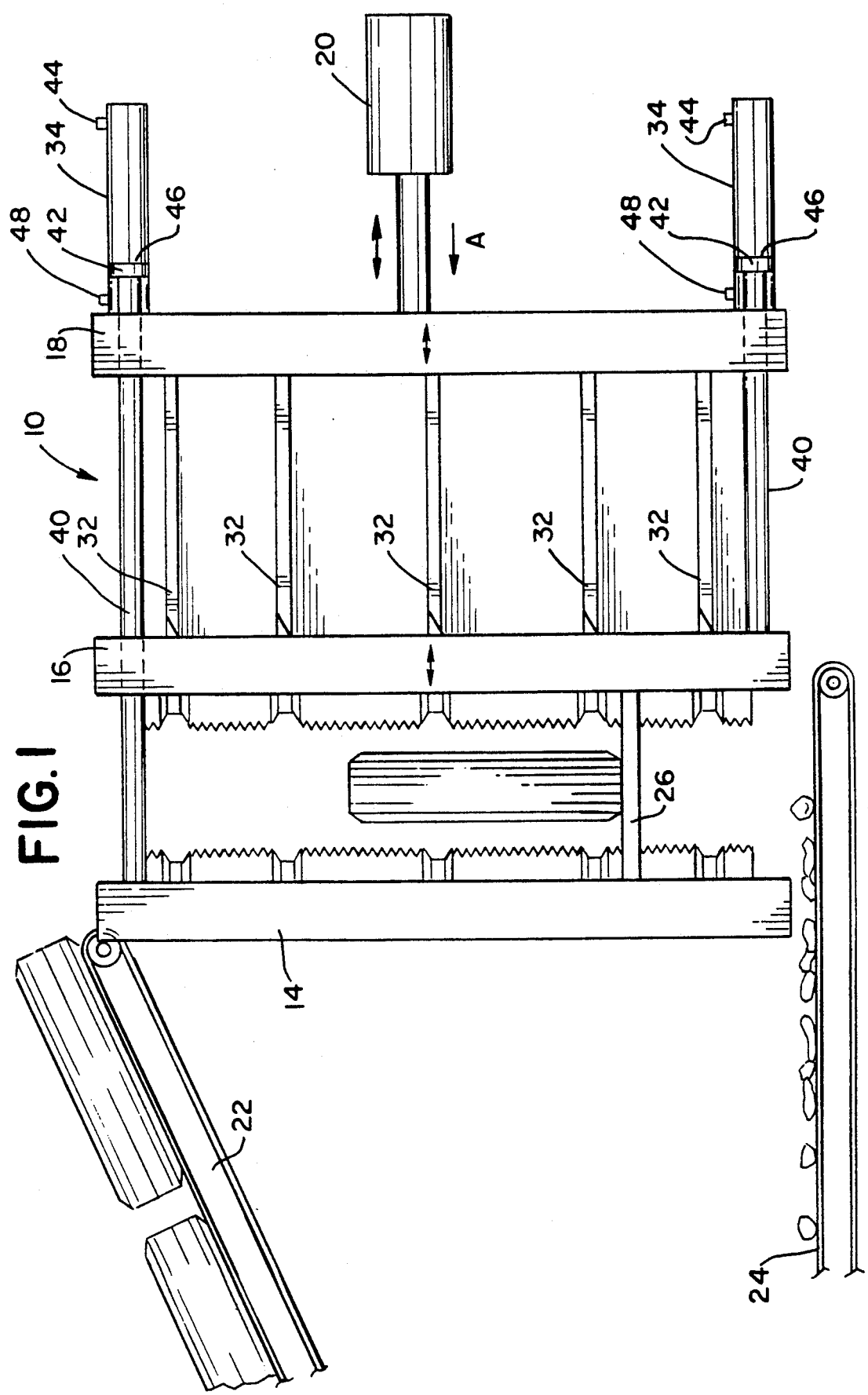
FIG. 1 is a perspective view of a hydraulic actuated tire cutter in accordance with the present invention.

The tire cutter 10 in accordance with the present invention can best be seen in FIG. 1. The tire cutter 10 essentially includes a first member or a first fixed plate 14, a second member or moving second plate 16, a third member or third blade plate 18 and a first hydraulic ram cylinder 20. A first conveyor belt 22 loads tires into a tire cutting position in a space between the fixed plate 14 and the moving plate 16, as shown in FIG. 1. After the tire has been cut, a second conveyor belt 24, located below the tire cutting position, removes the pieces of tires from the tire cutter apparatus 10.

Figure 2:
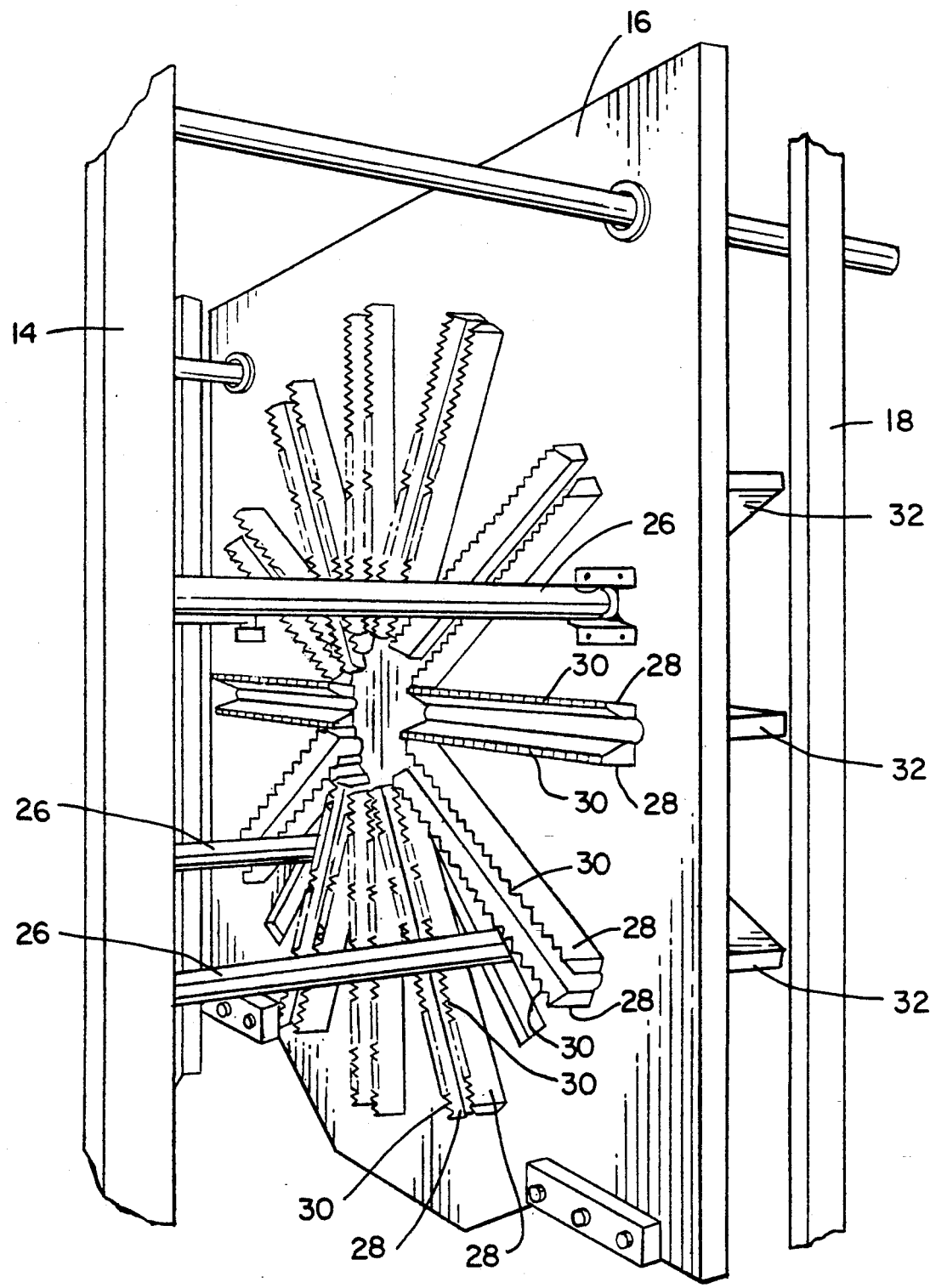
FIG. 2 is a perspective view of a fixed plate with twelve pairs of gripping jaws 28 integrally attached.
Figure 5:
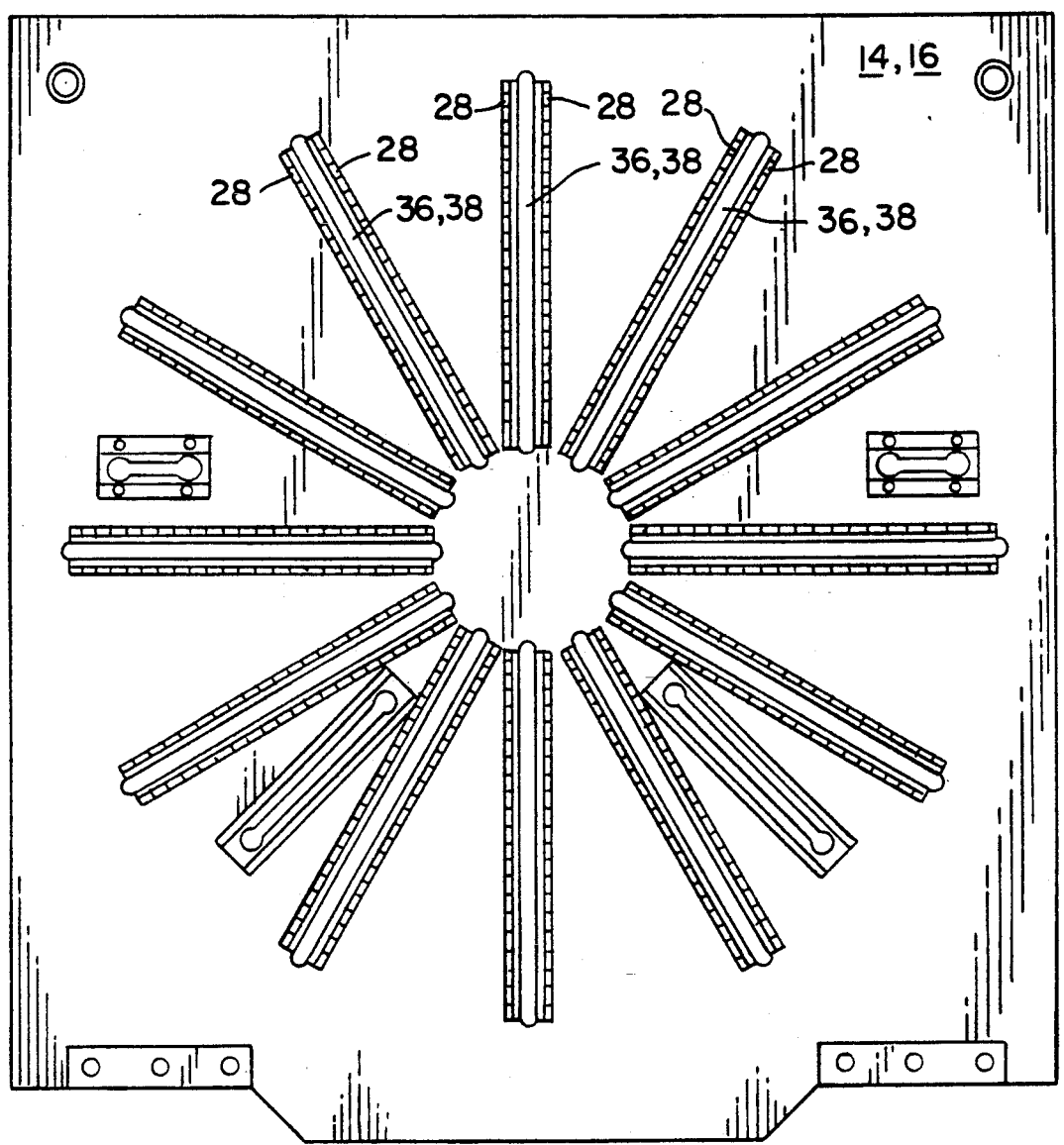
FIG. 5 is a front elevation view of a fixed or moving plate.
Figure 6:
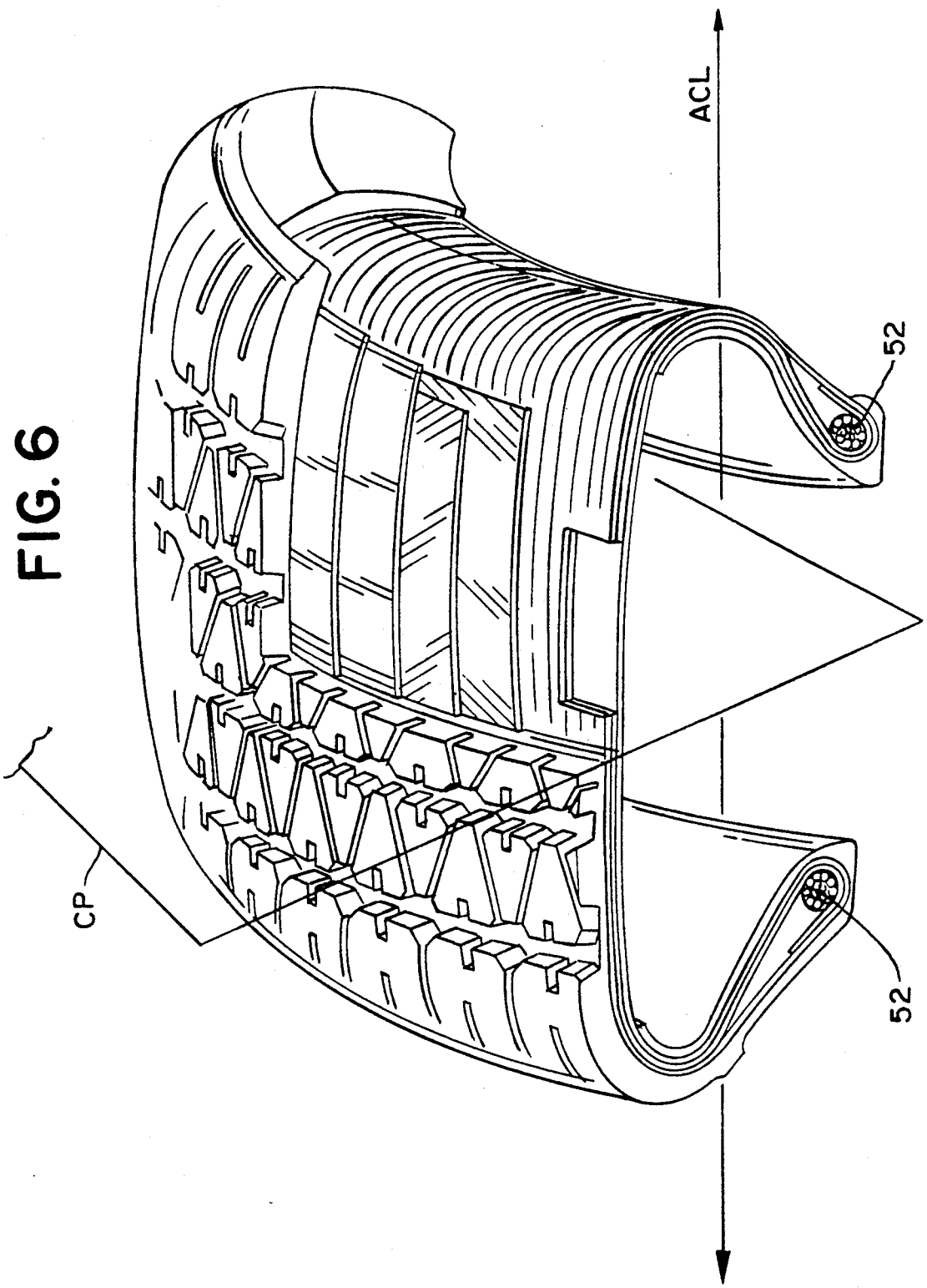
FIG. 6 is a cross-sectional perspective view, partially broken away, of a typical tire such as might be shredded in the invention.

A plurality of radially adjustable bars 26, as shown in FIG. 2, are used to help position the tire in the tire cutting position. The position of the bars 26 may be varied to accommodate different size tires. As shown in FIG. 2, the bars 26 have been adjusted for a smaller size tire, such as an automobile tire. One of ordinary skill in the art would realize that the bars 26 would be adjusted in the radially outward position to accommodate a tire of a larger size, such as a truck tire. With the aid of the adjustable bars 26, the fixed plate 14 and the moving plate 16, a tire is held or mounted in substantially the same plane as the fixed and moving plates. The tire is oriented so that its centerplane CP (see FIG. 6) is approximately parallel to the planes of the fixed plate 14 and moving plate 16. It is believed that this orientation is preferred to limit the weight of machinery necessarily suspended over the tire. For example, if the tire was laid flat, a cylinder and moving plate 16 might have to be suspended over the tire, adding greatly to the height of the machine and difficulty of design. Of course, other objects besides bars, such as a plate, may be used to help guide a tire into the tire cutting position.

A plurality of gripping jaws 28 project from the fixed and moving plates 14, 16. The protruding edge of the gripping jaws 28 includes a saw tooth edge 30 which aids in the gripping of the tire. Each pair of gripping jaws 28 on the moving plate 16 are in registration positioned with a pair of gripping jaws 28 on the fixed plate 14, as shown in FIGS. 3 and 4. In the illustrated embodiment, there are twelve pairs of gripping jaws 28 on the fixed plate 14 and twelve pairs of gripping jaws 28 on the moving plate 16. The gripping jaws 28 are positioned so that they extend radially outwardly from centers of the fixed and moving plates 14, 16, those centers corresponding to the axial centerline ACL of the tire. As such, the tire cutter segments the tire by cutting it along radial lines. This feature is important to enable the tire cutter 10 to accommodate tires of different diameters.

The blade plate 18 has blades 32 mounted to the side of the blade plate 18 facing the moving plate 16. There are shown, in the illustrated embodiment, twelve blades 32, one for each pair of gripping jaws. When the tire cutter is being used to cut a larger tire, only six blades 32 are used. This is done to reduce the hydraulic power required to cut through a larger tire. Therefore, the same hydraulic actuation device can be used for small and large tires. Six of the blades 32 can be removed from the blade plate 18 before the cutting process is to begin. Of course, it is preferable to remove every other blade 32. Any number of blades 32 may be used depending upon the size of the tire. Also, the tire cutter 10 could be made to accommodate more than twelve blades 32 if the need ever arises.

As shown in FIGS. 3 and 4, the blade 32 passes first through a passage 38 in the moving plate 16 and then through a passage 36 in the fixed plate 14 to thereby cut a section of a tire in the radial direction. There are twelve passages 36 in the fixed plate 14 and twelve passages 38 in the moving plate 16. The passages 36, 38 are radially arrayed about an axis of movement of the blade plate 18 toward the space between the fixed plate 14 and the moving plate 16. The gripping jaws 28 are grouped in pairs with the jaws 28 of each pair being disposed on opposite sides of a passage 36 in the fixed plate 14 and a passage 38 in the moving plate 16. The passage 36 is in registration with the passage 38 to permit passage of a blade 32 through the fixed plate 14 and the moving plate 16 when the fixed plate 14 and the moving plate 16 are adjacent to one another, as shown in FIGS. 3 and 4.

A hydraulic cylinder 34 is positioned on the outward side of the blade plate 18 facing away from the moving plate 16. A piston rod 40 extends from the moving plate 16 through the blade plate 18. A piston 42 is attached at the free end of the piston rod 40. A hydraulic fluid, at a predetermined pressure, is inside of the hydraulic cylinder 34 on the side 46 of the piston 42 opposite of the moving plate 16 and the blade plate 18.

A conventional hydraulic pump (not shown) supplies the hydraulic fluid to the hydraulic cylinder 34 through a port 44. A conventional two way valve (not shown) is placed between the line from the hydraulic pump and the hydraulic cylinder 34. The two way valve regulates the hydraulic pressure at the predetermined pressure and when the predetermined pressure is exceeded in the cylinder 34, allows the hydraulic fluid to return to the reservoir so that said blade plate 18 can move with respect to said moving plate 16.

FIG. 1 shows the hydraulic cylinders 34 and piston rods 40 in exemplary form. In the preferred embodiment, there are six hydraulic cylinders and piston rods utilized. Each cylinder and piston rod combination being placed radially equidistantly around the center of the moving plate 16.

A port 48 allows hydraulic fluid to be applied to the hydraulic cylinder on the side of the piston 42 facing the moving plate 16 and the blade plate 18. Hydraulic fluid is applied to the port 48 so that the moving plate 16 can be moved toward the blade plate 18 and the front end of the blades 32 can be easily serviced, sharpened, or replaced.

The operation of the hydraulic tire cutter is as follows. A tire is first placed on a first conveyor belt 22 and loaded into a tire cutting position as shown in FIG. 1. Primary hydraulic actuating means are then applied to linearly move the ram cylinder 20 in the forward or left direction, as shown by arrow A, in FIG. 1. The ram cylinder 20 is actuated to the left and concurrently moves the blade plate 18 and the moving plate 16 to the left because the piston rod 40 transfers the hydraulically actuated force directly to the moving blade plate 18.

During the forward movement of the blade plate 18, the position of the blade plate 18 with respect to the moving plate 16 does not change because the resistance force from the moving plate 16 is below the predetermined pressure. The blade plate 18 continues to move forward and the moving plate 16 contacts the tire and starts to compress the tire between the plurality of gripping jaws 28. When the gripping jaws 28 have compacted or compressed the tire to substantially the tire's smallest width, so that the tire's beads 52 (see FIG. 6) are essentially touching as shown in FIG. 3, the resistance force from the moving plate 16 reaches the predetermined pressure. The hydraulic fluid in the cylinders 34 then returns to the reservoir and the blade plate 18 is moved forward with respect to the moving plate 16. During this movement to the left, the moving plate 16 remains stationary and the blade plate 18 and blades 32 continue to move forward. The blades 32 first pass through the passage 38 in the moving plate 16 and then through the tire thereby cutting the tire, and then through the passage 36 in the fixed plate 14, as shown in FIG. 4.

Once the blades 32 have passed far enough forward to ensure that the tire has been completely cut, a trip switch (not shown) is actuated and the hydraulic actuation is reversed to move the ram cylinder 20 in the direction to the right or in the reverse direction. The blades 32 and the blade plate 18 are first moved to the right until the blades 32 are positioned to the right of the moving plate 16. During this step the hydraulic cylinders 34 expand with hydraulic fluid until they are fully expanded. Thereafter, the blade plate 18 and moving plate 16 are moved in unison to the far right position as shown in FIG. 1. The tire pieces cut by the blades 32 then fall to the bottom of the apparatus 10 onto the conveyor belt 24. Conveyor belt 24 thereafter removes the pieces of tire from the apparatus 10. The process can thereafter be continued to cut another tire or other objects.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

Thus, it is to be understood that variations in the shape and configurations of the tire cutter and its components can be made without departing from the novel aspect of this invention as defined in the appended claims.

What is claimed is:

1. An apparatus for cutting a tire comprising:
   a first member having a passage extending therethrough;
   a second member spaced from said first member;

a means for holding a tire between said first and second members, said means being secured to one of said first and second members;

a third member spaced from said second member;

a cutting means mounted on said third member, for cutting said tire into a plurality of pieces; and, a means for moving said third member with respect to said first member, which is fixedly mounted with respect to said third member, so that said cutting means enters said passage of said first member.

2. An apparatus as in claim 1 further including a first conveyor belt to load a tire into said apparatus.

3. An apparatus as in claim 2 further including a second conveyor belt to remove said plurality of tire pieces from said apparatus.

4. An apparatus as in claim 1 wherein said first member further includes a gripping jaw facing said second member.

5. An apparatus as in claim 4 wherein said second member further includes a gripping jaw facing said first member.

6. An apparatus as in claim 5 wherein said gripping jaw of said first member and said gripping jaw of said second member each have a saw toothed edge.

7. An apparatus as in claim 6 wherein said first and second members each have a plurality of passages therein, said passages being arrayed about an axis of movement of said third member toward said first member, the gripping jaws are grouped in pairs with the jaws of each pair being disposed on opposite sides of a passage of each member so that said passage of said first member will be in registration with said passage of said second member to permit passage of said cutting means through said second member and into said first member.

8. An apparatus as in claim 7 wherein said cutting means is a blade.

9. An apparatus as in claim 1 wherein said third member is actuated by a primary hydraulic drive means.

10. An apparatus as recited in claim 9 wherein said means for moving said third member includes a piston rod extending from said second member through said third member, a hydraulic cylinder surrounding said piston rod on a side of said third member facing away from said second member, a hydraulic fluid, at a predetermined pressure, contained in said hydraulic cylinder on a side of the piston opposite said second and third members, said piston rod transferring hydraulic force from the primary drive means directly to said second member when a resistance force of said second member is below said predetermined pressure, wherein when the resistance force of said second member is greater than said predetermined pressure then said third member is moved with respect to said second member so that said cutting means is then being passed through said second member to cut said tire.

11. An apparatus as in claim 1 wherein said means for holding comprises a plurality of bars mounted between said first member and said second member to position said tire in a plane paralleling a plane of said first member and a plane of said second member.

12. An apparatus as in claim 11 wherein a radial position of said plurality of bars is adjustable.

13. An apparatus for cutting a tire comprising:
(a) a fixed first member;
(b) a second member spaced from said first member;
a holding device for holding a tire in a space between said first and second members wherein said holding device is secured to at least one of said first and second members, said holding device being adjustable to accommodate tires of different diameters;
(c) a third member spaced from said second member;
(d) a cutting means mounted on said third member for cutting said tire into a plurality of pieces; and
(e) a means for moving said third member with respect to said first and second members so that said cutting means enters said space between said first and second members.

14. An apparatus as in claim 13 further including a first conveyor belt to load a tire into said apparatus.

15. An apparatus as in claim 14 further including a second conveyor belt to remove said plurality of tire pieces from said apparatus.

16. An apparatus as in claim 13 wherein said first member further includes a gripping jaw facing said second member.

17. An apparatus as in claim 16 wherein said second member further includes a gripping jaw facing said first member.

18. An apparatus as in claim 17 wherein said gripping jaw of said first member and said gripping jaw of said second member each have a saw toothed edge.

19. An apparatus as in claim 18 wherein said first and second members have passage means therein, said passage means being arrayed about an axis of movement of said third member toward said space between said first and second members, the gripping jaws are grouped in pairs with the jaws of each pair being disposed on opposite sides of a passage means of each member so that said passage means of said first member will be in registration with said passage means of said second member to permit passage of said cutting means through said first and second members when said first and second members are adjacent to one another.

20. An apparatus as in claim 19 wherein said cutting means is a blade.

21. An apparatus as in claim 20 wherein said third member is actuated by a primary hydraulic drive means.

22. An apparatus as recited in claim 21 wherein said means for moving said third member includes a piston rod extending from said second member through said third member, a hydraulic cylinder surrounds a piston of said piston rod, a hydraulic fluid, at a predetermined pressure, being inside of said cylinder on a side of the piston opposite said second and third members, said piston rod transferring a hydraulic force from the primary drive means directly to said second member when a resistance force of said second member is below said predetermined pressure, when the resistance force of said second member is greater than said predetermined pressure than said third member is so moved with respect to said second member that said cutting means is then being passed through said second member to cut said tire.

23. An apparatus as in claim 13 wherein said holding device comprises a plurality of bars mounted between said first member and said second member to position said tire in a plane paralleling a plane of said first member and a plane of said second member.

24. An apparatus as in claim 23 wherein a radial position of said plurality of bars is adjustable.

25. An apparatus for cutting tires into sections, said apparatus comprising:
a first plate;
a second plate, said second plate being generally parallel to and spaced from said first plate;

suspension means for suspending an associated tire between said first and second plates, said suspension means extending between said first and second plates;

gripping means for gripping the associated tire, said gripping means being secured to at least one of said first and second plates; and, cutting means for cutting the associated tire into sections, said cutting means comprising a blade which sequentially passes through said second plate, through the associated tire and then into said first plate, thereby cutting the associated tire into sections.

26. An apparatus of claim 25 wherein said first and second plates each have slots, said blade selectively extending through said slots when said blade sequentially extends through said second plate, the associated tire and into said first plate.

27. An apparatus of claim 26 wherein said slots in said first plate extend radially outwardly from a center of said first plate and said slots in said second plate extend radially outwardly from a center of said second plate.

28. The apparatus of claim 27 wherein said first plate lies in a first vertical plane and said second plate lies in a second vertical plane, said first and second vertical planes being parallel.

29. The apparatus of claim 27 wherein said gripping means is located adjacent said slots in at least one of said first and second plates.

30. The apparatus of claim 26 wherein said gripping means comprises saw toothed edges.

31. The apparatus of claim 25 wherein said second plate is selectively moveable toward said first plate.

32. The apparatus of claim 31 wherein said associated tire is crushed between said first and second plate prior to being cut by said blade.

33. The apparatus of claim 25 further comprising:
tire centering means for centering said associated tire within said apparatus.

34. The apparatus of claim 33 wherein said tire centering means comprises:
a first bar extending between said first and second plate, said first bar being adjustable between first and second positions, said first position corresponding to a tire of a first diameter and said second position corresponding to a tire of a second diameter.

35. The apparatus of claim 25 wherein said blade has first and second ends, said second end being attached to a movement generation means for generating reciprocal linear movement.

36. The apparatus of claim 35 wherein said blade is selectively removable from said movement generation means.

37. The apparatus of claim 35 wherein said movement generation means comprises:
a hydraulic cylinder.

38. The apparatus of claim 35 wherein said movement generation means further comprises:
a third plate, said third plate being generally parallel to said first and second plates, said third plate having an inward and an outward side; and,
a first blade cylinder, said first blade cylinder having first and second ends, said first end of said first blade cylinder attached to said outward side of said third plate.

39. The apparatus of claim 38 wherein said movement generation means further comprises:
a first ram cylinder, said first ram cylinder having a piston with a free end which is attached to said outward side of said third plate, said first ram cylinder selectively moving said third plate inwardly toward said first and second plates.

40. An apparatus for cutting a tire comprising:
a first member;
a second member spaced from said first member;
a third member spaced from said second member and said first member, wherein said first, second and third members are each substantially vertically oriented in relation to a subadjacent support surface;
a means for holding a tire between said first and second members;
a cutting means mounted on said third member for cutting said tire into a plurality of pieces; and,
a means for moving said third member with respect to said first member, wherein said first member is fixed in relation to a path of movement of said third member during and between every cutting cycle, and wherein said cutting means enters the space between said first and second members to cut the tire.

* * * * *